Nov. 29, 1960   R. HEINEMANN ET AL   2,962,144
DEVICE FOR HOLDING A PAIR OF MEMBERS TOGETHER SO THAT
THEY DO NOT MOVE RELATIVE TO EACH OTHER, SUCH
AS A CLUTCH OR A BRAKE
Filed May 20, 1957   2 Sheets-Sheet 2
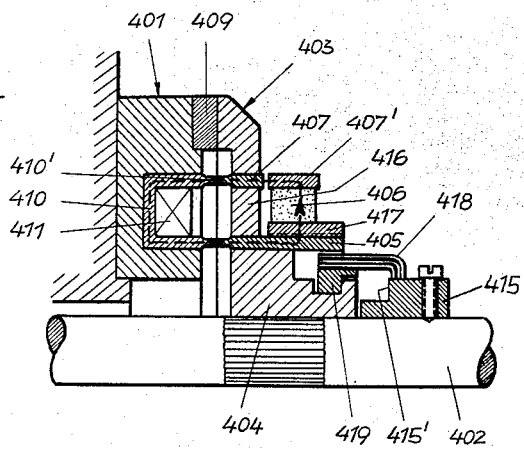
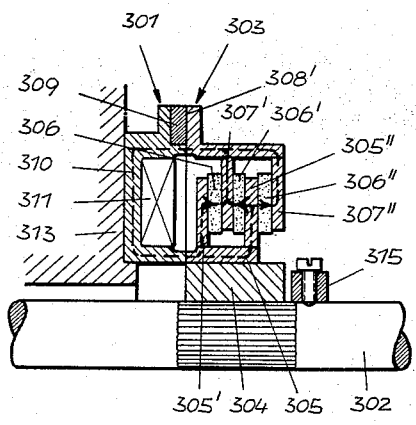
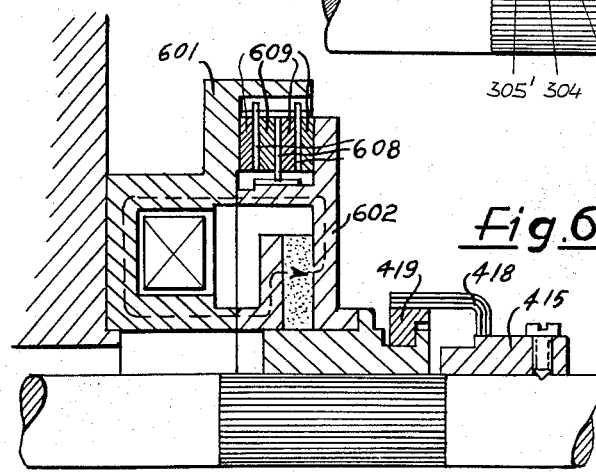
INVENTORS
Rolf Heinemann
Manfred Zeh
BY Michael S. Striker

United States Patent Office 2,962,144
Patented Nov. 29, 1960

2,962,144

DEVICE FOR HOLDING A PAIR OF MEMBERS TOGETHER SO THAT THEY DO NOT MOVE RELATIVE TO EACH OTHER, SUCH AS A CLUTCH OR A BRAKE

Rolf Heinemann, Stuttgart-Zuffenhausen, and Manfred Zeh, Stuttgart, Germany, assignors to Firma Georgii Elektro-Motoren-Apparatebau - Kommanditgesellschaft, Stuttgart, Germany Filed May 20, 1957, Ser. No. 660,348

Claims priority, application Germany May 19, 1956

13 Claims. (Cl. 192—84)

The present invention relates to devices such as clutches or brakes wherein a pair of members are releasably held together so as to be immovable with respect to each other.

More particularly, the present invention relates to electromagnetically actuated devices of this type. Such electromagnetically actuated devices of the above type fall in general into two main categories. Thus, one type of device of the above type includes an electromagnetic for holding the parts of the clutch or brake together immovably when the electromagnet is energized, and this class of devices is desirable because it operates with a relatively high efficiency and a strong force can be provided by the electromagnet. However, this class of devices has a serious defect in that if the power supply should fail the electromagnet will become deenergized and the clutch or brake will no longer remain engaged. The other general class of devices of this type includes springs which hold the parts of the clutch or brake together so as to be immovable with respect to each other, and in this type of device an electromagnetic is provided for urging the parts away from each other to their disengaged position against the force of the springs. While this class of device overcomes the drawbacks of presenting the possibility of failure of operation when the power supply fails, it has the disadvantage of operating at a relatively low efficiency because of the spring force which must be overcome by the electromagnet.

One of the objects of the present invention is to overcome the above drawbacks by providing a device of the above type which is capable of having the parts thereof held releasably immovably together without the use of any structure which requires a source of power, so that if the power supply fails the parts will still be held immovably together, and without the use of any springs or the like for holding the parts together so that the disadvantage of low efficiency is also eliminated.

Another object of the present invention is to provide a device of the above type which will continue to operate efficiently as the parts become worn without requiring any adjustments to be made to compensate for wearing of the parts.

A further object of the present invention is to provide a device of the above type with a means of enabling the force with which the parts are held immovably together to be easily adjusted.

An additional object of the present invention is to provide a device of the above type with an arrangement which enables the power of the device applied to holding the parts thereof together immovably to be of any desired value.

It is also an object of the present invention to provide a structure capable of accomplishing all of the above objects and at the same time being composed of simple and ruggedly constructed elements which are very reliable in operation.

With the above objects in view, the present invention mainly consists of a device for releasably holding a pair of parts immovably together, such as a clutch or a brake, this device including first and second members which are located adjacent and directed toward each other. A support means supports the first member for movement to an engaged position where the members are immovable with respect to each other and to a disengaged position where the members are movable with respect to each other. A permanent magnet is carried by one of these members for producing the force for moving the first member to its engaged position, and an electromagnet is carried by the other of the members, for providing a counter force for moving the first member to its disengaged position when the electromagnet is energized. A pair of magnetically conductive means are respectively carried by the first and second members and abut against each other when the first member is in its engaged position so as to provide a path for the lines of magnetic force directly between the pair of magnetically conductive means when the first member is in its engaged position.

The novel features which are considered as characteristic for the invention are set forth in particular in the appended claims. The invention itself, however, both as to its construction and its method of operation, together with additional objects and adavntages thereof, will be best understood from the following description of specific embodiments when read in connection with the accompanying drawings, in which:

Fig. 4 is a fragmentary sectional elevational view showing only the upper portion of a fourth embodiment of the present invention, Fig. 5 is a fragmentary sectional elevational view showing only the upper portion of still another embodiment of a device according to the present invention; and Fig. 6 is a fragmentary sectional elevational view showing only the upper portion of a sixth embodiment of the present invention.

In the description which follows the structure of the invention will be described in detail as applied only to brakes, although it will be readily understood by those skilled in the art that the invention is equally applicable to clutches.

Figure 1:
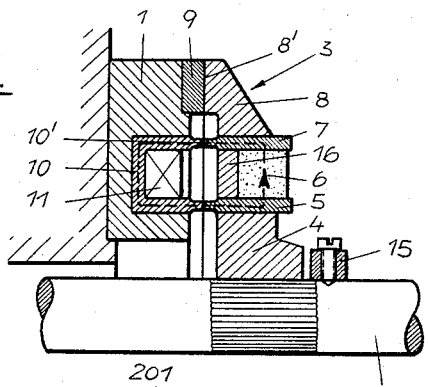
Fig. 1 is a fragmentary sectional elevational view showing only an upper portion of one possible device according to the present invention.

Referring to Fig. 1, only the upper portion of a brake is shown, this brake being of an annular construction and extending about the shaft 2. The brake includes a stationary annular member 1 which is carried by any suitable support, and the rotatable shaft 2 which is to be braked carries the other brake member 3 which is axially shiftable with respect to the shaft 2 but is constrained to rotate with the latter as by having a splined connection therewith. The brake member 3 is composed of a plurality of annular elements which are fixed to each other so as to form the brake member 3. Thus, the brake member 3 includes an inner annular hub portion 4 which is carried directly by the shaft 2 and which has an outer cylindrical surface on which is located a ring 5 made of soft iron, this ring 5 forming part of a magneically conductive means, as will be pointed out below. The ring 5 has an outer cylindrical surface, and on this cylindrical surface is arranged an annular permanent magnet 6 which is fixed to the ring 5, the ring 5 being in turn fixed to the ring 4. To the outer cylindrical surface of the permanent magnet 6 is fixed another ring 7 which is made of soft iron in the same way as the ring 5. Finally, an outer ring 8 surrounds and is fixed to the outer cylindrical surface of the ring 7, and the ring 8 has a left flat face 8' which cooperates with the brake lining 9 fixedly carried by the member 1 so as to produce the frictional engagement between the members 1 and 3 which is required to stop the rotation of the shaft 2. The brake lining ring 9 is annular and fixed in any suitable way as by rivets or the like to the member 1, and all of the above described elements are coaxially arranged with respect to each other.

The member 1 is formed with an annular groove directed toward the member 3, and a channel 10 of soft iron and annular configuration is arranged within this groove and fixed therein to the member 1. This channel 10 has a U-shaped configuration and has outer and inner walls 10' which extend toward the rings 5 and 7 and which are of the same diameter as these rings so that the latter rings and the inner and outer sides of the channel 10 form extensions of each other. The ring 10 is so arranged with respect to the rings 5 and 7 that the inner and outer annular portions 10' of the channel 10 abut at their right faces, as viewed in Fig. 1, directly against the left faces of the rings 5 and 7, respectively, when the brake is engaged, the member 3 forming a member which is supported by the shaft 2 which forms a support means for movement to the left, as viewed in Fig. 1, to an engaged position illustrated in Fig. 1 and to the right, as viewed in Fig. 1, to a disengaged position where the braking face 8' of the member 3 is spaced from the brake lining ring 9.

It will be apparent from the discussion below that the members 5, 7, and 10 form a pair of magnetically conductive means respectively carried by the members 3 and 1 for permitting the lines of magnetic force to flow respectively directly between the inner and outer annular portions of the channel 10 and the rings 5 and 7, and in accordance with the present invention the abutting portions of the rings 5 and 7, on the one hand, and the inner and outer annular portions of the channel 10, on the other hand, are of a cross section which is smaller than the portions of these elements located beyond their abutting portions, so that at their abutting portions the density of the lines of magnetic force is increased and relatively high. The ring 6 is so magnetized that its lines of magnetic force extend radially with respect to the axis of the shaft 2, and the magnetically conductive means 5, 7, and 10 form a closed circuit for the lines of magnetic force when the brake is in the engaged position shown in Fig. 1, the circuit of the magnetic lines of force having its smallest cross section at the places where the magnetic lines of force travel between the ring 10, on the one hand, and the rings 5 and 7, on the other hand.

An annular electromagnet 11 is located within the channel 10 and is supplied through unillustrated leads with direct current from any suitable source of direct current, and the field of the electromagnet 11 has a strength equal to that of the permanent magnet 6 but directed oppositely to the permanent magnet 6 so that the force created by the electromagnet 11 when it is energized will oppose the force of the permanent magnet 6.

It is preferred to make the parts 1, 4, and 8 of a non-magnetic material so as to avoid as much as possible magnetic stray fields and shunting effects.

A collar 15 is fixed to the shaft 2 by any suitable set screw or the like and is spaced to the right of the member 3 when the parts have the position shown in Fig. 1, this ring or collar 15 serving as a stop member for limiting the movement of the member 3 to the right, as viewed in Fig. 1 and for determining the disengaged position of the member 3.

The operation of the structure of Fig. 1 is quite simple. When the coil 11 is energized the field produced by the electromagnet 11 operates in opposition to that of the permanent magnet 6 in the magnetic circuit provided by the parts 5, 6, 7, and 10, and the force of the electromagnet 11 cancels the force of the permanent magnet 6 so that the rings 5 and 7 are pushed away from the channel 10 and thus the brake member 3 is shifted axially through a relatively short distance away from the stationary brake member 1, this movement being limited by the stop ring 15. As soon as these members 1 and 3 move away from each other, there is formed between the inner and outer annular portions of the channel 10, on the one hand, and the rings 5 and 7, on the other hand, an air gap which causes the demagnetizing action of the electromagnet 11 on the permanent magnet 6 to be diminished.

As soon as the flow of current through the electromagnet 11 is interrupted, its electromagnetic counter field collapses, so that the magnetic lines of force are derived at this time solely from the permanent magnet 6, and as a result the rings 5 and 7 are attracted toward the channel 10 so that the member 3 approaches the member 1 until the braking surface 8' presses against the brake lining ring 9 so that the brake becomes engaged.

Because of the relatively small cross section of the rings 5 and 7 and the channel 10 at the portions thereof which abut against each other when the brake is engaged, the induction is increased at the areas where the rings 5 and 7 engage the channel 10. However, in addition, the diminished area of contact between the rings 5 and 7, on the one hand, and the channel 10, on the other hand, results in a quicker wearing away of the abutting surfaces of the magnetically conductive elements 5, 7, and 10, and in fact these surfaces wear away quicker than the brake lining ring 9. This quicker wear of the magnetically conductive elements guarantees that the pressure with which the surface 8' bears against the ring 9 is diminished to only a slight extent by the cooperation between the channel 10 and the rings 5 and 7, so that the latter elements do not undesirably influence the action of the brake to any appreciable degree.

Figure 3:
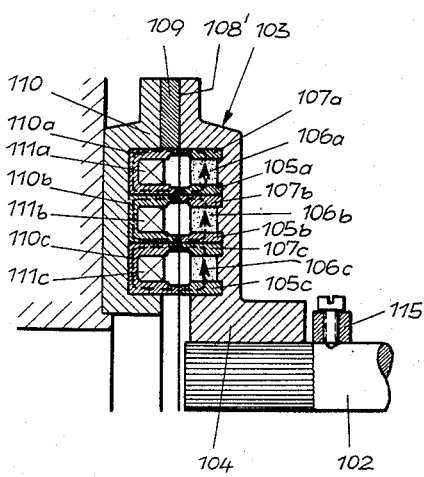
Fig. 3 is a fragmentary sectional elevational view showing only the upper portion of a third possible construction according to the present invention.

In the embodiment of the invention which is shown in Fig. 3, several of the parts correspond to those of Fig. 1, and in order to avoid repetition those parts of Fig. 3 which correspond to Fig. 1 and have already been described are indicated with the same reference characters increased by 100. Thus, it is necessary to discuss only the differences between the embodiment of Fig. 3 and that of Fig. 1. With the embodiment of Fig. 3, the member 103 has its hub portion 104 connected integrally with the outer peripheral portion of the member 103 whose surface 108' bears against the brake lining ring 109. Instead of a single permanent magnet 6, as in the case of Fig. 1, the permanent magnet of Fig. 3 is made up of three permanent magnet portions 106a, 106b, and 106c, these permanent magnet portions being in the form of concentric annular rings. Concentric rings 105a, 105b, and 105c, respectively cooperate with the permanent magnet portions in the same way that the ring 5 cooperates with the ring 6 in the embodiment of Fig. 1, and also concentric rings 107a, 107b, 107c respectively cooperate with the permanent magnet portions 106a–106c, these rings 107a–107c corresponding to the rings 7 of Fig. 1. Also, the stationary brake member of Fig. 3 carries three channels 110a, 110b, and 110c which are respectively located opposite the permanent magnet portions coaxially therewith and which are concentrically arranged in the manner shown in Fig. 3, the inner and outer rings of the several channels cooperating with the rings 105a–105c and 107a–107c in the manner clearly illustrated in Fig. 3. Electromagnet coils 111a–111c of annular configuration are respectively located in the channel 110a–110c and respectively cooperate with the permanent magnets 106a–106c, respectively, in the same way that the electromagnet 11 cooperates with the permanent magnet 6 in the embodiment of Fig. 1. The several electromagnets 111a–111c are connected either in parallel or in series in a known way with a source of direct current. In order to provide fields which extend in the same direction at the pole faces of the annular permanent magnet portions 106a–106c, these are arranged with respect to each other in such a way that the like poles of a pair of adjacent rings are directed toward each other. In other words, each of the permanent magnet rings will have one pole extending along its outer periphery and another pole extending along its inner periphery, and the pole at the outer periphery of one ring is the same as the pole at the inner periphery of the next outer ring. The embodiment of Fig. 3 clearly operates in the same way as the embodiment of Fig. 1, so that a detailed description of the operation of the embodiment of Fig. 3 is not presented.

Figure 2:
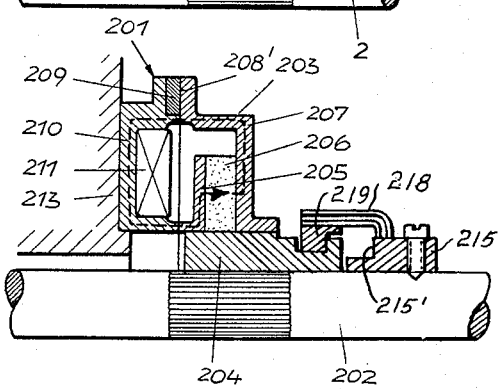
Fig. 2 is a fragmentary sectional elevational view showing only the upper portion of another embodiment of a device according to the present invention.

The embodiment of the invention which is illustrated in Fig. 2 has the elements thereof which correspond to the elements of Fig. 1 indicated with the same reference characters increased by 200. This embodiment which is shown in Fig. 2 differs essentially from that of Fig. 1 in that the permanent annular magnet 206 of the embodiment of Fig. 2 has its lines of magnetic force extending axially, whereas, as was pointed out above, the lines of magnetic force of the permanent magnet 6 of Fig. 1 extend radially. Thus, with the embodiment of Fig. 2 the magnetically conductive rings 205 and 206 are constructed differently from the corresponding rings 5 and 6 of Fig. 1. As is apparent from Fig. 2, the hub 204 which is made of a non-magnetic material has the annular ring 207 fixed thereto and located at the right face of the permanent magnet 206, this ring 207 being integral with the member 203 and with the surface 208' thereof which cooperates with the brake lining member 209. The stationary brake member 201 is directly carried by a machine part 213, and the stationary part 201 itself forms the channel 210 in which the electromagnet 211 is located, this part 210 directly carrying the brake lining ring 209.

The hub 204 is provided at its outer surface with an annular groove in which a ring 219 is located, and ring 219 carries a plurality of fingers 218 which are fixed one above each other to the ring 219. The free ends of the springy finger 218 are curved downwardly to engage the outer surface of the stop ring 215. The springy fingers 218 cooperate with the surface 215' of the stop ring in the same manner as described below in connection with fingers 418 and surface 415' of the embodiment shown in Fig. 4.

For many purposes it is desirable or necessary that the braking force be capable of adjustment with a relatively simple structure, and the embodiment of Fig. 4 is of particular advantage in this respect. With the embodiment of Fig. 4 it is possible to increase the magnetic resistance of the magnetically conductive elements at a part of the path of lines of force which is located between the permanent magnet and the electromagnet. This arrangement is of particular advantage since it permits the force with which the movable brake member is applied to the stationary brake member to be adjusted, and with the embodiment of Fig. 4 it is unnecessary in order to effect this adjustment to make any changes at the coil of the electromagnet. As is apparent from Fig. 4, the outer magnetically conductive ring of the member 403, which corresponds to the member 3 of Fig. 1, is made up of a pair of portions 407 and 407', the left portion 407, as viewed in Fig. 4, being fixed to the member 403 and forming part thereof. The permanent magnet 406 is fixedly carried by a ring 417 which has threads at its inner surface and which is in threaded engagement with threads at the outer surface of the inner magnetically conductive ring 405. The permanent magnet 406 fixedly carries at its outer cylindrical surface the outer part 407' of the outer magnetically conductive ring. Thus, by turning the ring 417 on the ring 405 the entire unit 407', 406, 417 may be shifted axially so as to adjust the air gap between the ring portions 407 and 407', and in this way the magnetic resistance of the circuit of the magnetic lines of force may be adjusted so as to regulate the pulling force of the entire arrangement.

As is apparent from Fig. 4, the air gap between the rings 407 and 407' is located in the magnetic circuit at a part thereof between the permanent magnet 406 and electromagnet 411. In this way the demagnetizing action of the electromagnet on the permanent magnet is diminished.

The hub 404 of the member 403 of the embodiment of Fig. 4 cooperates with a stop ring 415 fixedly carried by the shaft 402 and corresponding to the stop ring 15 of Fig. 1. The hub 404 is provided in its outer surface with an annular groove in which a ring 419 is located, and this ring carries a plurality of springy fingers 418 which are fixed one above the other to the ring 419. At their right ends, as viewed in Fig. 4, the springy fingers 418 are curved downwardly toward the stop ring 415 and have free ends each of which engages the outer surface of the stop ring 415. With this arrangement, as the brake lining ring 409 becomes worn so that when the brake is engaged the member 403 becomes located to a greater extent to the left, as viewed in Fig. 4, there will come a time when the innermost springy finger 418 will snap down into the space between the stop ring 415 and the hub 404 to abut against the left face 415' of the stop ring 415 so as to limit the movement of the hub 404 to the right to an extent greater than that shown in Fig. 4. As the lining 409 continues to become worn to a greater extent, the successive fingers 418 will snap in front of the surface 415', and in this way an arrangement is provided for automatically compensating for the wear of the brake by maintaining the movement of the member 403 to its disengaged position at a desired small value as the brake becomes worn to an increasing extent. It will be noted that the groove in which the ring 419 is located is slightly wider than the ring 419, so that when a finger 418 engages the surface 415', the member 403 will still be capable of shifting to a relatively small extent to its disengaged position. This structure shown in Fig. 4 is of particular advantage when the brake is arranged vertically with the member 403 thereof beneath the stationary member 401 so that the member 403 tends to move as a result of its own weight toward its disengaged position.

With all of the embodiments of the invention the parts of the pair of magnetically conductive means which are respectively carried by the stationary and movable members and which engage each other when the brake is engaged, are of a reduced cross section with respect to the remainder of these magnetically conductive means, and in this way without materially increasing the magnetic resistance the density of the lines of magnetic force is increased to a maximum at the places where the magnetically conductive means of one member engages the magnetically conductive means of the other member, and thus a maximum induction is produced. Inasmuch as the pulling force of the magnetic arrangement is proportional with the square of the induction and decreases only linearly with respect to the area of the engaging surface, this reduction in the cross section of the magnetically conductive elements at their portions which abut against each other provides a substantially linear increase in the pulling force of the magnetic arrangement. Thus, it is possible to obtain with a given power of the permanent magnet an optimum pulling force or braking force where the structure of the invention is applied to a brake. As a result, it is possible to use with the structure of the invention a permanent magnet which is capable of retaining its original magnetic force without any change in this force being effected by the influence of the cooperating magnetic structure such as the electromagnet. A permanent magnet of this type is capable of being manufactured with a much higher retentivity than permanent magnets whose properties are such that their magnetic characteristics will be substantially influenced by cooperating magnetic structure such as an electromagnet. Therefore, it is possible to use with the structure of the invention permanent magnet having a high retentivity while at the same time being capable of maintaining its original magnetic force and all of its original magnetic characteristics substantially unchanged throughout the entire use of the device. This fact makes it possible for the first time to arrange the electromagnet on one of the cooperating members of the brake or clutch and the permanent magnet on the other of these members to obtain a repelling force between the two members when the electromagnet is energized. With prior devices where a pair of members are releasably held together so as to be immovable with respect to each other, such as prior brakes or clutches, a permanent magnet would have its magnetic properties very greatly changed by a counter magnetic force of equal size as a result of the low retentivity of a conventional permanent magnet.

Permanent magnets which have the desired properties for producing the results of the present invention may be made, for example, of a ceramic material having metal oxides included therein, such as polyoxides of barium and iron e.g. as known under the trade names Koerox and Oxit. Ceramic permanent magnets of this type have a very high retentivity but up till the present time could not be used in brakes and clutches since a permanet magnet does not have a sufficient magnetic force (remanance) for these purposes.

Since the cross section of the magnetically conductive elements which engage each other when the brake is engaged is at a minimum and since the pulling force of the permanent magnet takes place practically without any air gap, it is possible to use in the brake of the invention a permanent magnet with a small original magnetic force (remanence). Thus, the choice of permanent magnets is limited only from the viewpoint of providing a permanent magnet having the highest possible rententivity and stability. Ceramic permanent magnets of the above type have proved to be particularly suitable. They are capable of retaining their original magnetic characteristics irrespective of outer influences such as the field of the electromagnet, and at the same time they have a very high retentivity and stability.

A ceramic permanent magnet of the above type has a relatively high internal resistance, and as a result the electromagnet which produces the opposing field must have a relatively large number of ampere turns. It is therefore of advantage to make the permanent magnet of several magnet parts of relatively small thickness in the direction of the lines of magnetic force and to interconnect these permanent magnet portions magnetically in parallel with each other. Such an arrangement is shown in Fig. 5 where the construction corresponds to that of Fig. 2 in that the lines of force extend axially with respect to the shaft 302. The permanent magnet of the embodiment of Fig. 5 is made up of three permanent magnet portions 306, 306', and 306". The magnetically conductive ring 305 which is fixed to the hub 304 of the member 303 has a pair of annular ring portions 305' and 305", while the outer part of member 303 has a pair of inwardly extending annular magnetically conductive portions 307' and 307". The innermost member 305' engages the left face of the permanent magnet portion 306, while the member 305" is located between and engages the permanent magnet portions 306' and 306". The ring 307' is located between and engages the permanent magnet portions 306 and 306', and the ring 307" engages the right face of the right permanent magnet portion 306". These permanent magnet portions are fixed to the magnetically conductive elements so as to be carried thereby. The remaining elements of Fig. 5 correspond to those of Fig. 2 and the operation thereof is believed to be clear. If it is assumed that the volume of the permanent magnet of Fig. 2 equals the total volume of the several permanent magnet portions of Fig. 5, then the number of counter ampere turns of the electromagnet 211 required to oppose the force of the permanent magnet 206 in order to disengage the brake is several times greater than the number of turns of the electromagnet 311 required to produce a force for overcoming the magnetic force of the several permanent magnet portions of Fig. 5. This advantage which is shown to be possible with the arrangement of Fig. 5 with respect to axially extending lines of force can correspondingly be provided with those embodiments of the invention where the lines of magnetic force extend radially toward the axis of the central shaft.

The structure of the invention provides a magnetically controlled brake which operates without current and whose output is far greater than a corresponding spring brake of known construction, and because of the fact that a permanent magnet is used the structure of the invention is perfectly safe since it will not fail in the event of a failure in the power supply. Not only is the structure of the invention of advantage with respect to its simplicity and safety, but in addition during the entire life of the brake lining no adjustments are necessary. Tests have shown that the brake of the invention is capable of producing substantially the same breaking force as that produced with an electromagnet of corresponding size. There is no upper limit to the force which can be provided with a brake according to the present invention since when the permanent magnet is composed of a plurality of permanent magnet portions then as many of these portions as desired may be provided and assembled together to provide as large a force as may be required.

Instead of arrangements where a single braking surface 8' cooperates with a brake lining 9, it is possible to use a plurality of braking surfaces cooperating with a plurality of brake lining surfaces. Such an arrangement is shown in Fig. 6 where laminations of brake linings 609 alternate with laminations of braking members 608. The braking members 608 are alternatively attached to the members 601 and 602 of the device, which is otherwise constructed substantially in the same manner as the embodiment shown in Fig. 2. The embodiment shown in Fig. 6 includes also an arrangement as shown in Fig. 4, in which a plurality of springy fingers 418 are fastened to ring 419 and cooperate with a stop ring 415 in the manner as described before to compensate for wear of the brake linings 609.

For those situations where there is a requirement for a clutch which must remain engaged when there is no supply of current, the structure of the invention can be applied without any difficulty to such a clutch inasmuch as the member which carries the electromagnet can be provided on or form part of a rotatable member and the current can be supplied to the electromagnet through slip rings.

Furthermore, the decrease in the cross section of the parts 5, 7, and 10 at the portions thereof which abut against each other when the brake is engaged can be used advantageously in known constructions where the electromagnet and the permanent magnet are carried by the same member of the clutch or brake.

It will be understood that each of the elements described above, or two or more together, may also find a useful application in other types of brakes or clutches differing from the types described above.

While the invention has been illustrated and described as embodied in electromagnetically operable brakes or clutches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for releasably holding a pair of members together so that they do not move relative to each other, such as a friction clutch or a friction brake, in combination, first and second members located adjacent and directed toward each other; shaft means supporting said first member for rotation about the axis of said shaft means and for movement toward said second member to an engaged position and away from said second member to a disengaged position; a permanent magnet carried by one of said members for providing a magnetic force for pulling said first member to said second member to locate said first member in said engaged position; an electromagnet carried by the other of said members for setting up when said electromagnet is energized a force opposing that of said permanent magnet for moving said first member away from said engaged position to said disengaged position thereof; and first and second magnetically conductive means carried respectively by said first and second members and engaging each other when said first member is in said engaged position thereof along engaging faces forming respectively surfaces of revolution about said axis for providing a closed circuit for substantially all the magnetic lines of force emanating from said permanent magnet when said first member is in said engaged position, said first and second magnetically conductive means being separated from each other when said first member is in said disengaged position thereof.

2. In a device for holding a pair of parts together so that they do not move relative to each other, such as a friction clutch or a friction brake, in combination, first and second members located adjacent and directed toward each other; shaft means supporting said first member for rotation about the axis of said shaft means and for movement with respect to said second member toward an engaged position where said members are immovable relative to each other and a disengaged position where said members are movable with respect to each other; a permanent magnet carried by one of said members for providing the force for moving said first member to said engaged position; an electromagnet carried by the other of said members for providing when said electromagnet is energized a counter force for moving said first member to said disengaged position thereof; and a pair of magnetically conductive elements carried respectively by said first and second members and abutting against each other when said first member is in said engaged position along engaging faces forming respectively surfaces of revolution about said axis for conducting directly between said elements substantially all lines of magnetic force.

3. In a device for holding a pair of parts together so that they do not move relative to each other, such as a friction clutch or a friction brake, in combination, first and second members located adjacent and directed toward each other; shaft means supporting said first member for rotation about the axis of said shaft means and for movement with respect to said second member toward an engaged position where said members are immovable relative to each other and a disengaged position where said members are movable with respect to each other; a permanent magnet carried by one of said members for providing the force for moving said first member to said engaged position; an electromagnet carried by the other of said members for providing when said electromagnet is energized, a counter force for moving said first member to said disengaged position thereof; and a pair of magnetically conductive elements carried respectively by said first and second members and abutting against each other when said first member is in said engaged position for conducting directly between said elements substantially all lines of magnetic force, emanating from said permanent magnet, said first and second elements having respectively at their portions which abut against each other engaging faces of an area smaller than the cross section of said elements located beyond said abutting portions thereof and forming respectively surfaces of revolution about said axis.

4. In a device for holding releasably a pair of parts together so that they are immovable with respect to each other, such as a friction clutch or a friction brake, in combination, first and second annular coaxial members located adjacent each other; shaft means supporting said first member for rotation about the axis of said shaft means and for movement axially with respect to said second member to an engaged position where said members are held together so as to be immovable with respect to each other and toward a disengaged position where said members are movable with respect to each other; an annular permanent magnet coaxial with said members and carried by one of said members for providing the force for moving said first member to said engaged position thereof; an annular electromagnet carried by the other of said members for providing a counter force for moving said first member to said disengaged position thereof; and first and second annular magnetically conductive means respectively carried by said first and second members coaxially with the latter and abutting against each other when said first member is in said engaged position thereof along engaging faces forming respectively surfaces of revolution about said axis for providing a path for substantially all the magnetic lines of force emanating from said permanent magnet directly between said first and second magnetically conductive means.

5. In a device for holding releasably a pair of parts together so that they are immovable with respect to each other, such as a friction clutch or a friction brake, in combination, first and second annular coaxial members located adjacent each other, said members being made of a non-magnetic material; shaft means supporting said first member for rotation about the axis of said shaft means and for movement axially with respect to said second member to an engaged position where said members are held together so as to be immovable with respect to each other and toward a disengaged position where said members are movable with respect to each other; an annular permanent magnet coaxial with said members and carried by one of said members for providing the force for moving said first member to said engaged position thereof; an annular electromagnet carried by the other of said members for providing a counter force for moving said first member to said disengaged position thereof; and first and second annular magnetically conductive means respectively carried by said first and second members coaxially with the latter and abutting against each other along engaging faces forming respectively surfaces of revolution about said axis when said first member is in said engaged position thereof for providing a path for substantially all the magnetic lines of force emanating from said permanent magnet directly between said first and second magnetically conductive means.

6. In a device for holding releasably a pair of parts together so that they are immovable with respect to each other, such as a clutch or a brake, in combination, first and second annular coaxial members located adjacent each other; support means supporting said first member for movement axially with respect to said second member to an engaged position where said members are held together so as to be immovable with respect to each other and toward a disengaged position where said members are movable with respect to each other; an annular permanent magnet coaxial with said members and carried by one of said members for providing the force for moving said first member to said engaged position thereof; an annular electromagnet carried by the other of said members for providing a counter force for moving said first member to said disengaged position thereof; and first and second annular magnetically conductive means respectively carried by said first and second members coaxially with the latter and abutting against each other when said first member is in said engaged position thereof for providing a path for substantially all the magnetic lines of force emanating from said permanent magnet directly between said first and second magnetically conductive means, said first and second magnetically conductive means respectively having at their portions which abut against each other engaging faces of an area smaller than the cross section of said first and second magnetically conductive means at portions thereof located beyond said abutting portions.

7. In a device as recited in claim 2, said permanent magnet being composed of a plurality of permanent magnet portions separated from each other and said one member which carries said permanent magnet including a plurality of magnetically conductive portions interposed between and engaging and carrying said permanent magnet portions and connecting said permanent magnet portions in parallel with each other.

8. In a device as recited in claim 2, said permanent magnet being made of a material of high retentivity.

9. In a device as recited in claim 2, said permanent magnet being made of a material of high retentivity and having the property of maintaining its original magnetic properties substantially unchanged by the influence of said electromagnet.

10. In a device as recited in claim 2, said permanent magnet being made of a ceramic material which includes a metal oxide.

11. In a device as recited in claim 2, said permanent magnet being made of a ceramic material and polyoxides of barium and iron.

12. A friction brake comprising, in combination, a stationary brake member; a rotatable brake member located adjacent and directed toward said stationary brake member; support means supporting said rotational brake member for movement toward an engaged position where said brake members are held immovably together and a disengaged position where said rotational brake member is capable of rotating freely with respect to said stationary brake member; a permanent magnet carried by said rotational brake member for urging the latter to its engaged position; an electromagnet carried by said stationary brake member for urging said rotational brake member to said disengaged position thereof when said electromagnetic is energized; and a pair of magnetically conductive means respectively carried by said members and abutting against each other when said rotational brake member is in said engaged position thereof for providing a direct path of flow for substantially all the magnetic lines of force emanating from said permanent magnet between said pair of magnetically conductive means.

13. In a device for holding a pair of parts releasably together so as to be immovable with respect to each other, such as a clutch or a brake, in combination, first and second members located adjacent and directed toward each other; support means supporting said first member for movement with respect to said second member to an engaged position where said members are immovable with respect to each other and to a disengaged position where said members are freely movable with respect to each other; a stop member carried by said support means on the side of said first member opposite from said second member for limiting the movement of said first member away from said second member to said disengaged position, said stop member having a front face spaced from said first member and a side face extending in the direction of movement of said first member; a permanent magnet carried by one of said members for providing the force for moving said first member to said engaged position; an electromagnet carried by said second member for providing a counter force for moving said first member to said disengaged position; and a plurality of radially inwardly biased springy fingers carried by said first member and respectively having free end portions located one behind the other with respect to said first member and bearing against said side face of said stop member for successively snapping into the space between said front face of said stop member and said first member to further limit the movement of said first member toward said stop member so as to automatically compensate for wear of said first and second members.

References Cited in the file of this patent

UNITED STATES PATENTS

| 517,831 | Arnold | Apr. 10, 1894 |
| 2,421,869 | Brock | June 10, 1947 |
| 2,492,205 | Warner | Dec. 27, 1949 |
| 2,544,360 | Schmidt | Mar. 6, 1951 |
| 2,568,858 | Kovac | Sept. 25, 1951 |
| 2,612,248 | Feiertag | Sept. 30, 1952 |
| 2,614,668 | Waderlow et al. | Oct. 21, 1952 |
| 2,692,035 | Rabinow | Oct. 19, 1954 |
| 2,722,617 | Cluwen et al. | Nov. 1, 1955 |
| 2,729,318 | Harter | Jan. 3, 1956 |
| 2,738,449 | Mason | Mar. 13, 1956 |
| 2,765,878 | Pierce | Oct. 9, 1956 |

FOREIGN PATENTS

| 722,768 | Great Britain | Jan. 26, 1955 |